(12) United States Patent
Kanazawa

(10) Patent No.: US 12,524,852 B2
(45) Date of Patent: Jan. 13, 2026

(54) GATING OF CONTEXTUAL ATTENTION AND CONVOLUTIONAL FEATURES

(71) Applicant: Google LLC, Mountain View, CA (US)

(72) Inventor: Noritsugu Kanazawa, Campbell, CA (US)

(73) Assignee: Google LLC, Mountain View, CA (US)

( * ) Notice: Subject to any disclaimer, the term of this patent is extended or adjusted under 35 U.S.C. 154(b) by 497 days.

(21) Appl. No.: 18/029,882

(22) PCT Filed: Dec. 17, 2020

(86) PCT No.: PCT/US2020/065580
§ 371 (c)(1),
(2) Date: Mar. 31, 2023

(87) PCT Pub. No.: WO2022/132153
PCT Pub. Date: Jun. 23, 2022

(65) Prior Publication Data
US 2023/0368340 A1    Nov. 16, 2023

(51) Int. Cl.
*G06T 5/77* (2024.01)
(52) U.S. Cl.
CPC ...... *G06T 5/77* (2024.01); *G06T 2207/20016* (2013.01); *G06T 2207/20084* (2013.01)
(58) Field of Classification Search
CPC .............. G06T 5/77; G06T 2207/20016; G06T 2207/20084
See application file for complete search history.

(56) References Cited

U.S. PATENT DOCUMENTS 10,430,946 B1 * 10/2019 Zhou ..................... G06N 3/094
11,200,889 B2 * 12/2021 Coucke .................. G10L 15/16

(Continued)

FOREIGN PATENT DOCUMENTS

| CN | 109598225 A | 4/2019 |
| CN | 110390017 B | 12/2022 |
| WO | 2019081623 A1 | 5/2019 |

OTHER PUBLICATIONS

China National Intellectual Property Administration, The First Office Action, mailed on Aug. 17, 2024, issued in connection with Chinese Patent Application No. 202080107622.8, 15 pages (with English Translation).

(Continued)

*Primary Examiner* — Kevin Ky
(74) *Attorney, Agent, or Firm* — McDonnell Boehnen Hulbert & Berghoff LLP

(57) ABSTRACT

A method includes determining a mask defining a portion of a perceptual representation, convolutional features associated with the perceptual representation, and contextual attention features associated with the perceptual representation. The method also includes determining a concatenation of the mask, the convolutional features, and the contextual attention features. The method additionally includes determining gate values for the portion, where determining gate values includes processing the concatenation using a machine learning model. The method further includes determining gated convolutional features based on the convolutional features and the gate values and gated contextual attention features based on the contextual attention features and the gate values. The method yet further includes generating refined values for the portion based on the gated convolutional features and the gated contextual attention features.

20 Claims, 7 Drawing Sheets

(56) References Cited

U.S. PATENT DOCUMENTS

| | | | | |
|---|---|---|---|---|
| 12,307,661 | B2* | 5/2025 | Suk | G16H 50/20 |
| 2021/0150678 | A1* | 5/2021 | Yi | G06T 3/4046 |
| 2023/0028046 | A1* | 1/2023 | Xing | G16H 50/30 |
| 2023/0290134 | A1* | 9/2023 | Hu | G06N 3/0464 |
| 2023/0368340 | A1* | 11/2023 | Kanazawa | G06N 3/045 |
| 2025/0139775 | A1* | 5/2025 | Marculescu | G16H 50/20 |
| 2025/0245390 | A1* | 7/2025 | Chen | G06F 30/13 |

OTHER PUBLICATIONS

Bulat et al., "Toward fast and accurate human pose estimation via soft-gated skip connections," arXiv:2002.11098v1, Feb. 25, 2020, 8 pages.

International Searching Authority, International Search Report and Written Opinion mailed on Sep. 2, 2021, issued in connection with International Patent Application No. PCT/US2020//065580, filed on Dec. 17, 2020, 16 pages.

Jam et al., "A comprehensive review of past and present image inpainting methods," Computer Vision and Image Understanding, 2021, vol. 203, 21 pages.

Yi et al., "Contextual Residual Aggregation for Ultra High-Resolution Image Inpainting," arXiv:2005.09704v1, May 19, 2020, 22 pages.

Yu et al., "Free-Form Image Inpainting with Gated Convultion," 2019 IEEE/CVF International Conference on Computer Vision (ICCV), 2019, pp. 4470-4479.

Yu et al., "Generatrive Image Inpainting with Contextual Attention," arXiv:1801.07892v2, Mar. 21, 2018, 15 pages.

Zeng et al., "High-Resolution Image Inpainting with Iterative Confidence Feedback and Guided Upsampling," arXiv:2005.11742v2, Jul. 14, 2020, 17 pages.

* cited by examiner

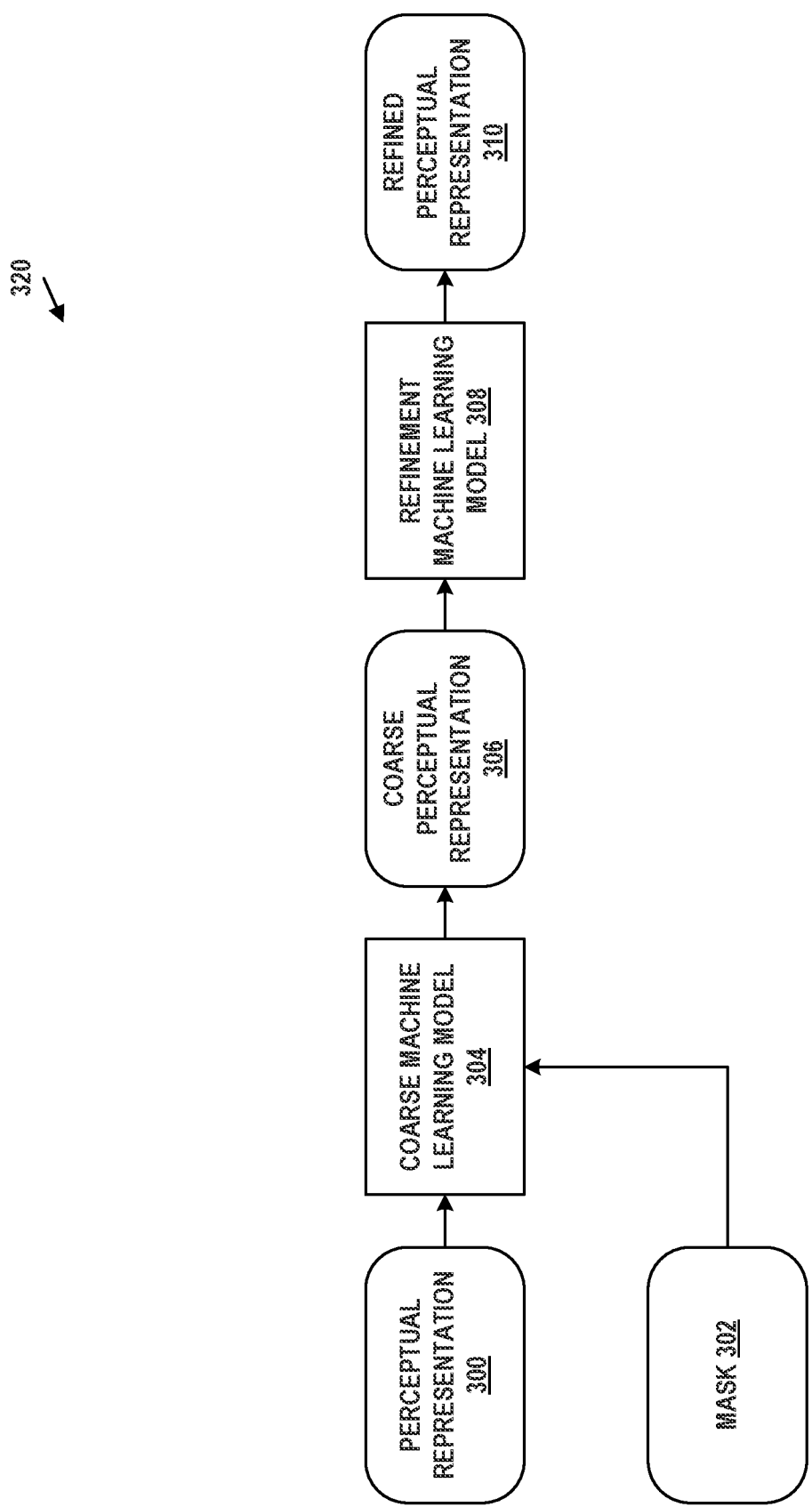

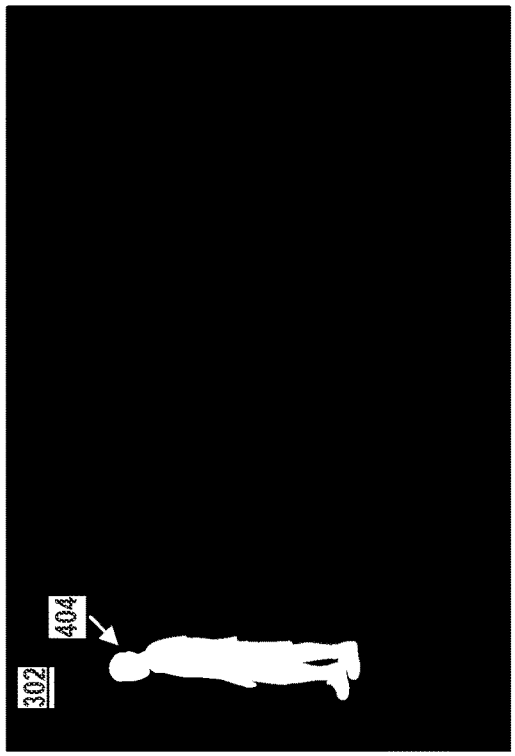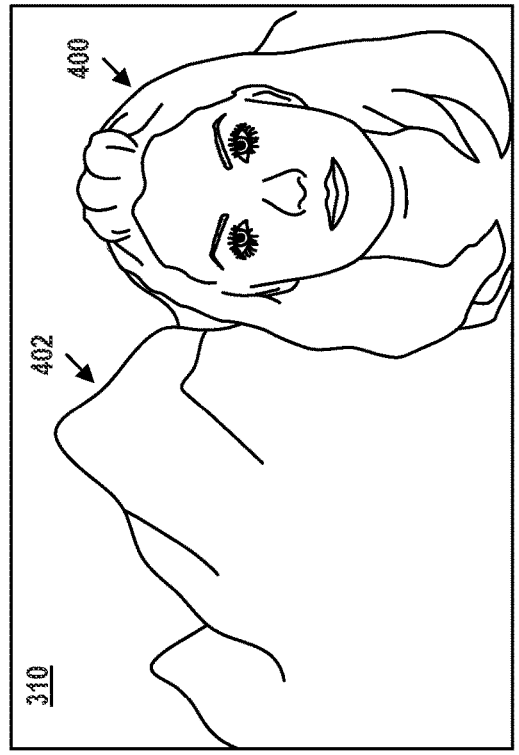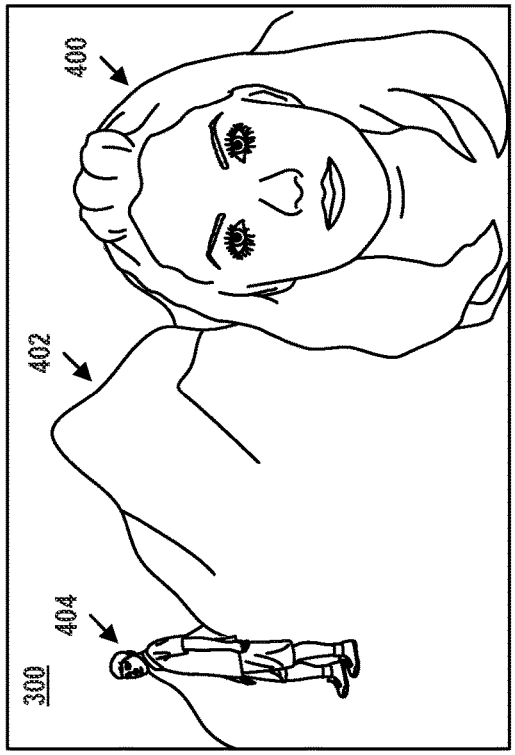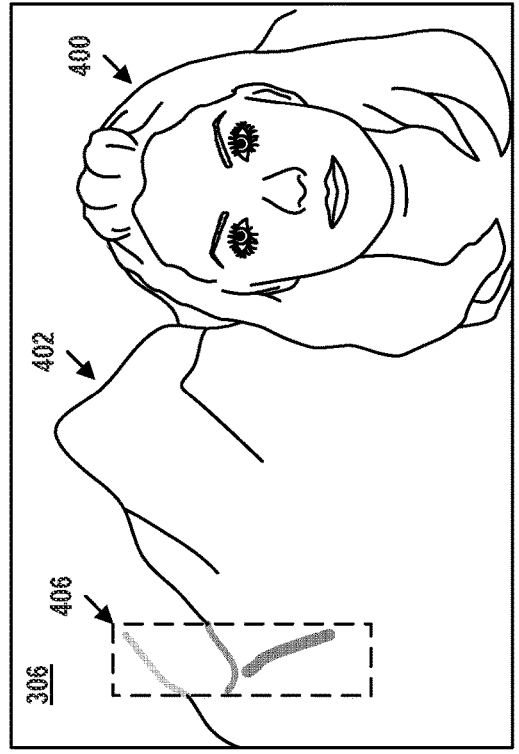

GATING OF CONTEXTUAL ATTENTION AND CONVOLUTIONAL FEATURES

CROSS-REFERENCE TO RELATED APPLICATIONS

The present application is a National Stage Application under 35 U.S.C. § 371 and claims priority to International Patent Application No. PCT/US2020/065580, filed Dec. 17, 2020, and titled "Gating of Contextual Attention and Convolutional Features," which is incorporated herein by reference in its entirety.

BACKGROUND

In-filling of a perceptual representation, such as an image, involves replacing damaged, deteriorated, removed, and/or otherwise missing portions of the perceptual representation. The replaced portions may be based on the remaining portions of the perceptual representation, and may thus be consistent with the remaining portions such that the resulting perceptual representation appears natural, non-synthetic, and/or as having an otherwise desirable quality. Various machine learning models, algorithms, and/or architectures may be configured to facilitate in-filling of perceptual representations.

SUMMARY

In-filling of a portion of a perceptual representation, such as an image, may be improved by including a gating layer configured to explicitly determine relative proportions of generative features and copied features used to determine refined sample values for the portion. Specifically, a mask defining the portion of the perceptual representation, convolutional (generative) features associated with the perceptual representation, and contextual attention (copied) features associated with the perceptual representation may be concatenated. The concatenation may be processed by a machine learning model, and the output of this machine learning model may be used to determine a plurality of gate values for the perceptual representation. The plurality of gate values may be used to weight the convolutional features and the contextual attention features, thereby generating gated convolutional features and gated contextual attention features. The gated convolutional features and the gated contextual attention features may be processed by a further machine learning model to generate the refined sample values for the portion.

In a first example embodiment, a computer-implemented method may include determining (i) a mask defining a portion of a perceptual representation, (ii) a plurality of convolutional features associated with the perceptual representation, and (iii) a plurality of contextual attention features associated with the perceptual representation. The computer-implemented method may also include determining a concatenation of the mask, the plurality of convolutional features, and the plurality of contextual attention features. The computer-implemented method may additionally include determining a plurality of gate values for the portion of the perceptual representation. Determining the plurality of gate values may include processing the concatenation using a machine learning model. The computer-implemented method may further include determining (i) a plurality of gated convolutional features based on the plurality of convolutional features and the plurality of gate values and (ii) a plurality of gated contextual attention features based on the plurality of contextual attention features and the plurality of gate values. The computer-implemented method may yet further include generating a plurality of refined values for the portion of the perceptual representation based on the plurality of gated convolutional features and the plurality of gated contextual attention features.

In a second example embodiment, a system is provided that includes a processor and a non-transitory computer-readable medium having stored thereon instructions that, when executed by the processor, cause the processor to perform operations. The operations may include determining (i) a mask defining a portion of a perceptual representation, (ii) a plurality of convolutional features associated with the perceptual representation, and (iii) a plurality of contextual attention features associated with the perceptual representation. The operations may also include determining a concatenation of the mask, the plurality of convolutional features, and the plurality of contextual attention features. The operations may additionally include determining a plurality of gate values for the portion of the perceptual representation. Determining the plurality of gate values may include processing the concatenation using a machine learning model. The operations may further include determining (i) a plurality of gated convolutional features based on the plurality of convolutional features and the plurality of gate values and (ii) a plurality of gated contextual attention features based on the plurality of contextual attention features and the plurality of gate values. The operations may yet further include generating a plurality of refined values for the portion of the perceptual representation based on the plurality of gated convolutional features and the plurality of gated contextual attention features.

In a third example embodiment, a non-transitory computer-readable medium may have stored thereon instructions that, when executed by a computing device, cause the computing device to perform operations. The operations may include determining (i) a mask defining a portion of a perceptual representation, (ii) a plurality of convolutional features associated with the perceptual representation, and (iii) a plurality of contextual attention features associated with the perceptual representation. The operations may also include determining a concatenation of the mask, the plurality of convolutional features, and the plurality of contextual attention features. The operations may additionally include determining a plurality of gate values for the portion of the perceptual representation. Determining the plurality of gate values may include processing the concatenation using a machine learning model. The operations may further include determining (i) a plurality of gated convolutional features based on the plurality of convolutional features and the plurality of gate values and (ii) a plurality of gated contextual attention features based on the plurality of contextual attention features and the plurality of gate values. The operations may yet further include generating a plurality of refined values for the portion of the perceptual representation based on the plurality of gated convolutional features and the plurality of gated contextual attention features.

In a fourth example embodiment, a system may include means for determining (i) a mask defining a portion of a perceptual representation, (ii) a plurality of convolutional features associated with the perceptual representation, and (iii) a plurality of contextual attention features associated with the perceptual representation. The system may also include means for determining a concatenation of the mask, the plurality of convolutional features, and the plurality of contextual attention features. The system may additionally include means for determining a plurality of gate values for the portion of the perceptual representation. Determining the plurality of gate values may include processing the concatenation using a machine learning model. The system may further include means for determining (i) a plurality of gated convolutional features based on the plurality of convolutional features and the plurality of gate values and (ii) a plurality of gated contextual attention features based on the plurality of contextual attention features and the plurality of gate values. The system may yet further include means for generating a plurality of refined values for the portion of the perceptual representation based on the plurality of gated convolutional features and the plurality of gated contextual attention features.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 3 illustrates a system, in accordance with examples described herein.

FIGS. 4A, 4C, and 4D illustrate perceptual representations, in accordance with examples described herein.

FIG. 4B illustrates a mask, in accordance with examples described herein.

DETAILED DESCRIPTION

Figure 1:
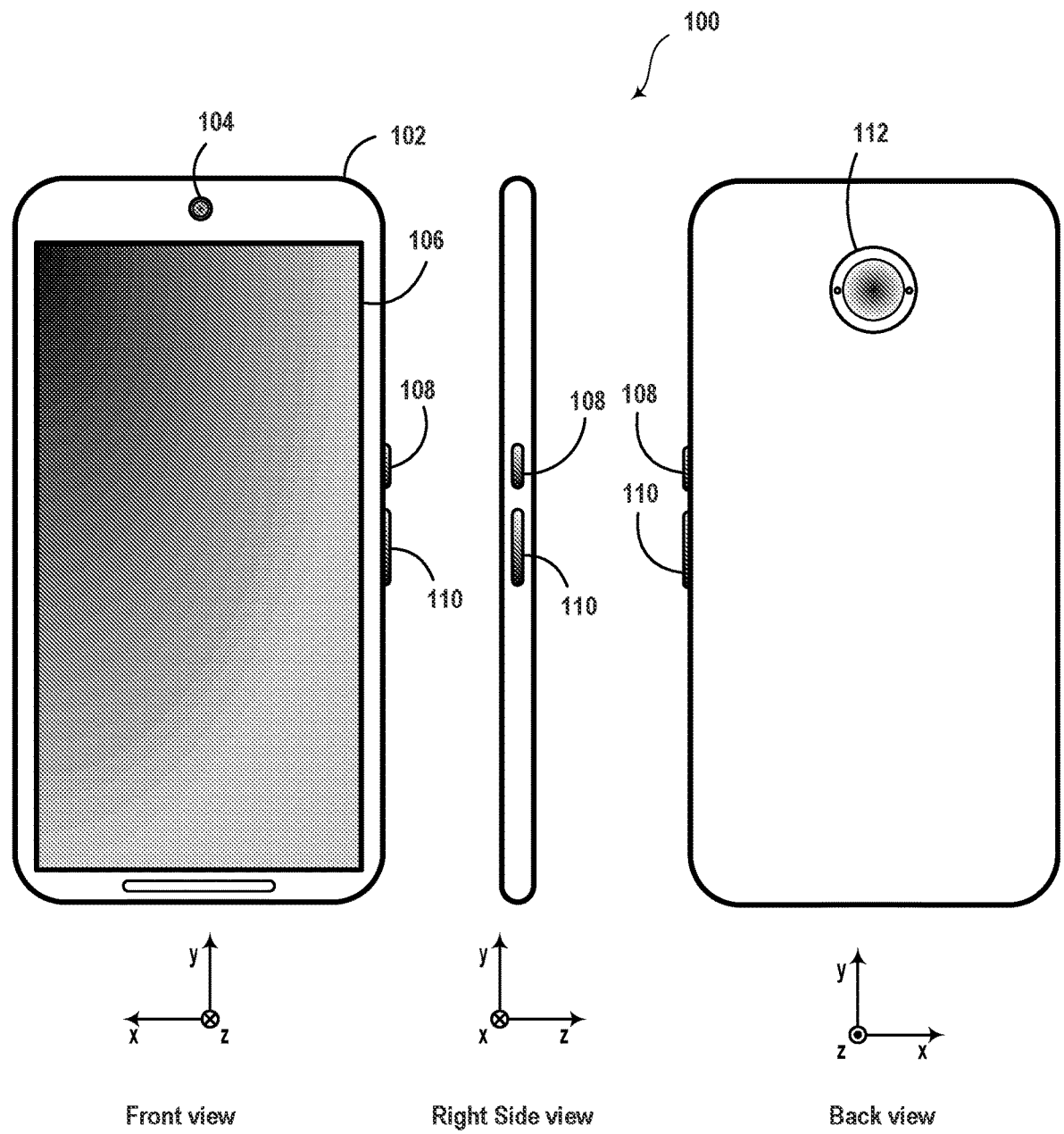
FIG. 1 illustrates a computing device, in accordance with examples described herein.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. Overview

In various contexts and applications, it may be desirable to replace a damaged, deteriorated, removed, and/or otherwise missing portion of a perceptual representation with sample values that match the rest of the perceptual representation. For example, when the perceptual representation is an image, it may be desirable to in-paint a missing region of the image with new pixel values that visually blend in with and/or otherwise match the rest of the image. When the perceptual representation is an audio waveform, it may be desirable to in-fill a missing section of the audio waveform with new sample values that aurally blend in with and/or otherwise match the rest of the audio waveform. A machine learning model may be configured to perform such replacement of portions of the perceptual representation.

Specifically, the machine learning model may be configured to determine refined sample values to replace the initial sample values of missing portions of the perceptual representation through a combination of generation and copying. For example, the machine learning model may be configured to determine (i) convolutional features that provide a basis for synthesizing new sample values and (ii) contextual attention features that provide a basis for copying sample values from other parts of the perceptual representation. Using the contextual attention features (copying) in combination with the convolutional features (synthesizing) may result in perceptual representations that appear natural, unaltered, and/or otherwise as having improved qualities. However, computing the contextual attention features may be computationally costly due to the relatively large number of mathematical operations involved. Thus, the contextual attention features may be computed at a reduced resolution (e.g., 32 by 32, rather than 256 by 256), thereby reducing the associated computational cost.

Due to the reduced resolution of the contextual attention features, refined sample values determined based on corresponding contextual attention features may appear unnatural, synthetic, and/or otherwise as having a relatively low quality. For example, sample values determined based on contextual attention features representing a straight line may appear blocky and/or may include translational shifts due to the reduced resolution of the contextual attention features. Stated another way, in some cases, when copying a sample value using contextual attention features, the semantic meaning of the underlying feature might not be preserved by the contextual attention features.

In order to compensate for these and other shortcomings, a gating architecture may be provided for explicitly determining the relative proportion of generative features and copied features at different samples in the perceptual representation. The gating architecture may be configured to determine an extent to which a contextual attention (copied) feature is combined with a corresponding convolutional (generative) feature in order to allow the resulting refined sample value to appear natural, realistic, and/or otherwise as having a relatively high quality. The relative proportion of generative features and copied features may be determined on a sample-by-sample basis, thus allowing, for example, copying to be favored for features that suffer relatively insignificant distortions under size scaling, and generation to be preferred for features that suffer relatively more significant distortions under size scaling.

The gating architecture may include a gate configured to determine a plurality of gate values. The gate may be configured to determine a concatenation of a mask that indicates a portion of a perceptual representation for which refined values are to be determined, convolutional (generative) features associated with the perceptual representation, and contextual attention (copied) features associated with the perceptual representation. A machine learning model (i.e., a gating model) may be configured to process the concatenation to generate the plurality of gate values. That is, the gating model may be trained to explicitly determine the relative proportion of convolutional features and contextual attention features at different samples in the perceptual representation based on the semantic contents of these features.

The plurality of gate values may be associated with, for example, the convolutional features. Accordingly, a blending function may be configured to multiply the convolutional features and the plurality of gate values to generate gated convolutional features. Additionally, the blending function may be configured to determine a plurality of residual gate values for the contextual attention features by subtracting each of the gate values from a predetermined scaling value. The scaling value may define an upper boundary of a range (e.g., 0 to 1, with the predetermined scaling value corresponding to 1) to which the gate values are mapped by the gating model. Subtraction of a given gate value from the predetermined scaling value may thus indicate the proportion of a corresponding sample resulting from a corresponding contextual attention feature. Accordingly, the blending function may further be configured to multiply the contextual attention features and the plurality of residual gate values to generate gated contextual attention features.

The blending function may be configured to combine the gated convolutional features and the gated contextual attention features and provide the combination to a machine learning model (i.e., an in-fill model) that has been trained to generate refined values for at least the masked portion of the perceptual representation based on the combination. For example, the gated convolutional features and the gated contextual attention features may be combined by determining a sum thereof and/or a concatenation thereof. Since the relative proportion of the generative (convolutional) features and the copied (contextual attention) features is explicitly represented by the combination, the in-fill model might not need to be trained to make this determination implicitly. Thus, a size of the in-fill model may be reduced while improving the overall quality of the refined values generated thereby.

II. Example Computing Devices and Systems

FIG. 1 illustrates an example computing device 100. Computing device 100 is shown in the form factor of a mobile phone. However, computing device 100 may be alternatively implemented as a laptop computer, a tablet computer, or a wearable computing device (e.g., a watch), among other possibilities. Computing device 100 may include various elements, such as body 102, display 106, and buttons 108 and 110. Computing device 100 may further include one or more cameras, such as front-facing camera 104 and rear-facing camera 112.

Front-facing camera 104 may be positioned on a side of body 102 typically facing a user while in operation (e.g., on the same side as display 106). Rear-facing camera 112 may be positioned on a side of body 102 opposite front-facing camera 104. Referring to the cameras as front and rear facing is arbitrary, and computing device 100 may include multiple cameras positioned on various sides of body 102.

Display 106 could represent a cathode ray tube (CRT) display, a light emitting diode (LED) display, a liquid crystal (LCD) display, a plasma display, an organic light emitting diode (OLED) display, or any other type of display known in the art. In some examples, display 106 may display a digital representation of the current image being captured by front-facing camera 104 and/or rear-facing camera 112, an image that could be captured by one or more of these cameras, an image that was recently captured by one or more of these cameras, and/or a modified version of one or more of these images. Thus, display 106 may serve as a viewfinder for the cameras. Display 106 may also support touchscreen functions that may be able to adjust the settings and/or configuration of any aspect of computing device 100.

Front-facing camera 104 may include an image sensor and associated optical elements such as lenses. Front-facing camera 104 may offer zoom capabilities or could have a fixed focal length. In other examples, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent, for example, a monoscopic camera. Rear-facing camera 112 may be similarly or differently arranged. Additionally, one or more of front-facing camera 104 and/or rear-facing camera 112 may be an array of one or more cameras.

One or more of front-facing camera 104 and/or rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the examples herein.

Computing device 100 may also include an ambient light sensor that may continuously or from time to time determine the ambient brightness of a scene that cameras 104 and/or 112 can capture. In some implementations, the ambient light sensor can be used to adjust the display brightness of display 106. Additionally, the ambient light sensor may be used to determine an exposure length of one or more of cameras 104 or 112, or to help in this determination.

Computing device 100 could be configured to use display 106 and front-facing camera 104 and/or rear-facing camera 112 to capture images of a target object. The captured images could be a plurality of still images or a video stream. The image capture could be triggered by activating button 108, pressing a softkey on display 106, or by some other mechanism. Depending upon the implementation, the images could be captured automatically at a specific time interval, for example, upon pressing button 108, upon appropriate lighting conditions of the target object, upon moving digital camera device 100 a predetermined distance, or according to a predetermined capture schedule.

Figure 2:
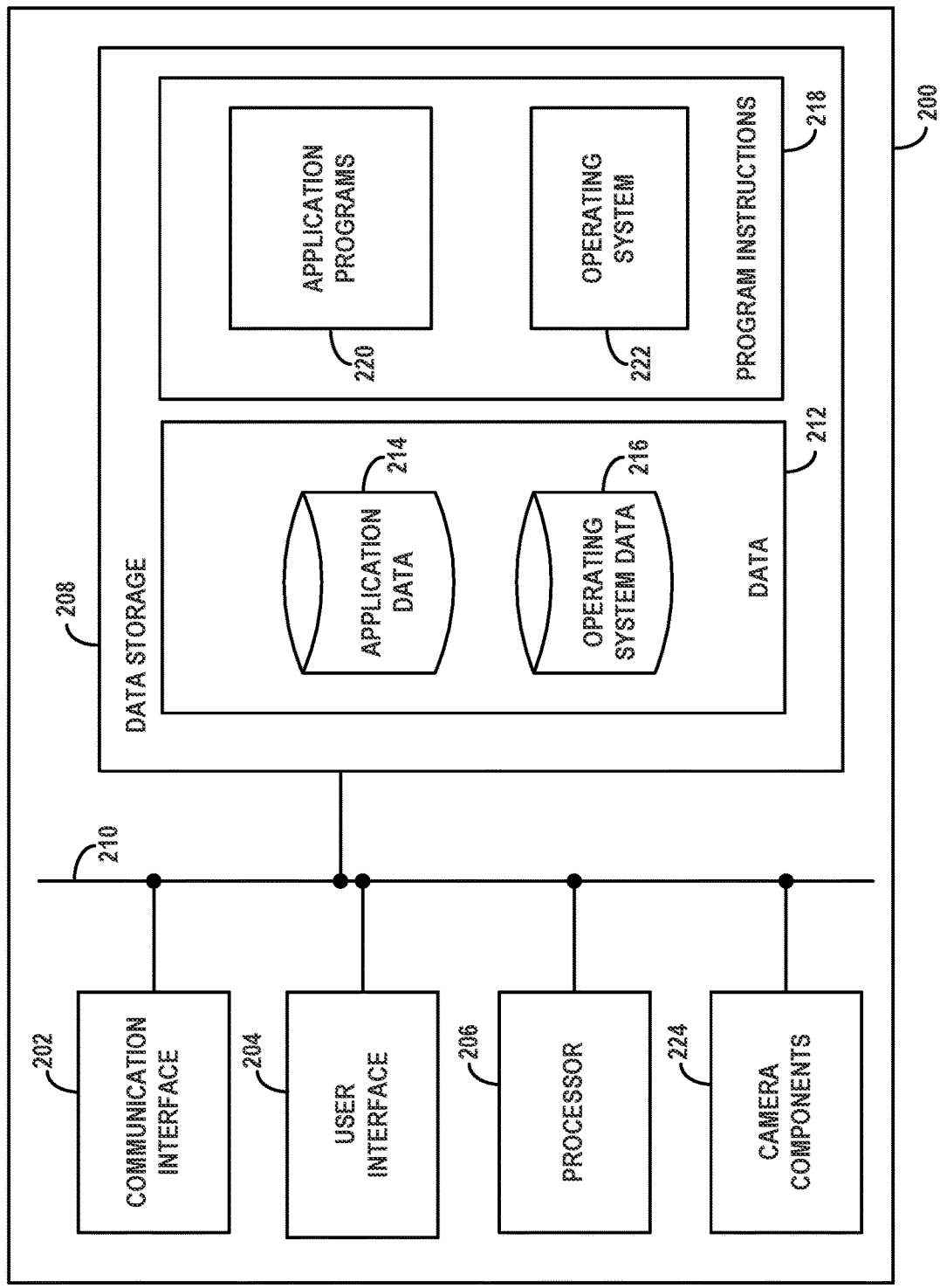
FIG. 2 illustrates a computing system, in accordance with examples described herein.

FIG. 2 is a simplified block diagram showing some of the components of an example computing system 200. By way of example and without limitation, computing system 200 may be a cellular mobile telephone (e.g., a smartphone), a computer (such as a desktop, notebook, tablet, or handheld computer), a home automation component, a digital video recorder (DVR), a digital television, a remote control, a wearable computing device, a gaming console, a robotic device, a vehicle, or some other type of device. Computing system 200 may represent, for example, aspects of computing device 100.

As shown in FIG. 2, computing system 200 may include communication interface 202, user interface 204, processor 206, data storage 208, and camera components 224, all of which may be communicatively linked together by a system bus, network, or other connection mechanism 210. Computing system 200 may be equipped with at least some image capture and/or image processing capabilities. It should be understood that computing system 200 may represent a physical image processing system, a particular physical hardware platform on which an image sensing and processing application operates in software, or other combinations of hardware and software that are configured to carry out image capture and/or processing functions.

Communication interface 202 may allow computing system 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wi-Fi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wi-Fi interface, a BLUETOOTH® interface, and a wide-area wireless interface).

User interface 204 may function to allow computing system 200 to interact with a human or non-human user, such as to receive input from a user and to provide output to the user. Thus, user interface 204 may include input components such as a keypad, keyboard, touch-sensitive panel, computer mouse, trackball, joystick, microphone, and so on. User interface 204 may also include one or more output components such as a display screen which, for example, may be combined with a touch-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices. User interface 204 may also be configured to receive and/or capture audible utterance(s), noise(s), and/or signal(s) by way of a microphone and/or other similar devices.

In some examples, user interface 204 may include a display that serves as a viewfinder for still camera and/or video camera functions supported by computing system 200. Additionally, user interface 204 may include one or more buttons, switches, knobs, and/or dials that facilitate the configuration and focusing of a camera function and the capturing of images. It may be possible that some or all of these buttons, switches, knobs, and/or dials are implemented by way of a touch-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing system 200, cause computing system 200 to carry out any of the methods, processes, or operations disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, audio-to-text functions, text translation functions, and/or gaming applications) installed on computing system 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing system 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some cases, application programs 220 may be referred to as "apps" for short. Additionally, application programs 220 may be downloadable to computing system 200 through one or more online application stores or application markets. However, application programs can also be installed on computing system 200 in other ways, such as via a web browser or through a physical interface (e.g., a USB port) on computing system 200.

Camera components 224 may include, but are not limited to, an aperture, shutter, recording surface (e.g., photographic film and/or an image sensor), lens, shutter button, infrared projectors, and/or visible-light projectors. Camera components 224 may include components configured for capturing of images in the visible-light spectrum (e.g., electromagnetic radiation having a wavelength of 380-700 nanometers) and components configured for capturing of images in the infrared light spectrum (e.g., electromagnetic radiation having a wavelength of 701 nanometers-1 millimeter). Camera components 224 may be controlled at least in part by software executed by processor 206.

III. Example Replacement and Refinement of Perceptual Representation Portions FIG. 3 illustrates an example system configured to replace and/or refine one or more portions of a perceptual representation. In this example, system 320 includes a coarse machine learning model 304 and a refinement machine learning model 308, each of which may be based on and/or include one or more machine learning algorithms, architectures, and/or components. For example, coarse machine learning model 304 and refinement machine learning model 308 may each include convolutional neural networks (CNNs) configured to apply various convolution and/or deconvolution operations.

Coarse machine learning model 304 may be configured to generate coarse perceptual representation 306 based on perceptual representation 300 and mask 302. Perceptual representation 300 may be a two-dimensional image, a three-dimensional image, a point cloud, a waveform, a textual data, and/or another type of data capable of being processed by a machine learning model. Mask 302 may indicate one or more portions of perceptual representation 300 to be removed and replaced with new values, and/or one or more portions of perceptual representation 300 that are to remain unmodified. Mask 302 may be specified manually by a user, determined using a machine learning model, and/or determined using a rule-based algorithm, among other possibilities.

In one example, perceptual representation 300 may be an image, and mask 302 may indicate a region of the image to be removed and in-painted with new values that are visually consistent with the remaining (unmodified) content of the image. In another example, perceptual representation 300 may be an audio waveform, and mask 302 may indicate sections of the audio waveform to be removed and replaced with new values that are aurally consistent with the remaining content of the audio waveform.

Coarse machine learning model 304 may be configured to replace initial sample values within the portion of perceptual representation 300 indicated by mask 302 with coarse sample values, thus generating coarse perceptual representation 306. For example, coarse machine learning model 304 may be configured to generate the coarse sample values by generating, using an encoder (e.g., a neural network arranged as an encoder), a latent space representation of non-masked (unmodified) portions of perceptual representation 300. Based on the latent space representation, coarse machine learning model 304 may be configured to generate, using a decoder (e.g., a neural network arranged as a decoder), the coarse sample values for the masked portion of perceptual representation 300. The coarse sample values may be "coarse" in that (i) their extent of visual, aural, textual, and/or other consistency with the non-masked portions of perceptual representation 300 may be below a threshold consistency value, (ii) they might not be perceived as realistic/natural by a human observer, and/or (iii) they might not be perceived as realistic/natural by a machine learning-based discriminator, among other possibilities.

Refinement machine learning model 308 may be configured to generate refined perceptual representation 310 based on coarse perceptual representation 306. Specifically, refinement machine learning model 308 may be configured to update the coarse sample values within the portion of perceptual representation 300 indicated by mask 302 with refined sample values, thus generating refined perceptual representation 310.

Refinement machine learning model 308 may generate the refined sample values by, for example, generating (i) a plurality of contextual attention features and (ii) a plurality of convolutional features, each of which may be generated using a corresponding encoder based on the non-masked portion of perceptual representation 300 and/or the coarse sample values of the masked portion of perceptual representation 300. Based on (i) the plurality of contextual attention features and (ii) the plurality of convolutional features, refinement machine learning model 308 may be configured to generate, using a decoder, the refined sample values for the masked portion of perceptual representation 300. The refined sample values may be "refined" in that (i) their extent of visual, aural, textual, and/or other consistent with the non-masked portions of perceptual representation 300 may be above the threshold consistency value, (ii) they may be perceived as realistic/natural by a human observer, and/or (iii) they may be perceived as realistic/natural by a machine learning-based discriminator, among other possibilities. For example, the refined sample values may be perceptually improved at least relative to the coarse sample values.

FIGS. 4A, 4B, 4C, and 4D provide visual examples of perceptual representation 300, mask 302, coarse perceptual representation 306, and refined perceptual representation 310, respectively. For example, perceptual representation 300 may be a two-dimensional (e.g., red-green-blue (RGB)) image, and may include therein representations of subject 400 (a first person), subject 404 (a second person), and scene 402 (mountains). For example, perceptual representation 300 may be an image (e.g., a "selfie") captured by subject 400, and the presence of subject 404 in the image may be undesirable.

A mask 302 may be generated to indicate that the representation of subject 404 is to be removed from perceptual representation 300, and replaced by pixel values that are visually consistent with the rest of the image. Mask 302 may be, for example, a binary image where a first value (e.g., 0, indicated by black coloring) is used to designate a pixel value that is to remain unmodified (i.e., a non-masked portion), and a second value (e.g., 1, indicated by while coloring) is used to designate a pixel value that is to be replaced and/or modified (i.e., a masked portion). The portion of mask 302 corresponding to subject 404 may be determined, for example, by a machine learning model configured to determine a segmentation map that identifies the pixels in perceptual representation 300 associated with subject 404.

As shown in FIG. 4C, a reference box 406 may be overlaid on coarse perceptual representation 306 to approximately indicate the portion of perceptual representation 300 masked by mask 302, and thus modified by coarse machine learning model 304. Reference box 406 is not part of coarse perceptual representation 306, and is shown for reference only. Specifically, all portions of coarse perceptual representation 306 outside of reference box 406 (and/or outside of the white portion of mask 302) may be the same as those of perceptual representation 300. The portion inside of reference box 406 (and/or inside of the white portion of mask 302) may include new pixel values that coarsely replace the representation of subject 404 with lines and textures that approximate the previously-hidden part of mountains 402. Thus, reference box 406 includes therein various lines and/or textures that resemble the lines and/or textures representing mountains 402 in other parts of the image, but that do not accurately in-paint the previously-hidden part of mountains 402.

As shown in FIG. 4D, refined perceptual representation 310 includes the image content of the inside of reference box 406 in coarse perceptual representation 306 refined to more accurately in-paint the previously-hidden part of mountains 402. Thus, refined perceptual representation 310 provides a realistic and/or visually-plausible replacement of the representation of subject 404 with lines, textures, and/or other features that complete the representation of mountains 402.

However, when the contextual attention features are determined at a relatively low resolution (e.g., 32 by 32 pixels, and/or another resolution that is sufficiently low to allow operation on a computationally-limited computing device), some parts of the lines, textures, and/or other features that complete the representation of mountains 402 may appear jagged, pixelated, and/or otherwise unnatural. Thus, a gating architecture may be provided as part of refinement machine learning model 308 to avoid such undesirable artifacts in refined perceptual representation 310 while allowing the contextual attention features to be computed at the relatively low resolution.

Figure 5:
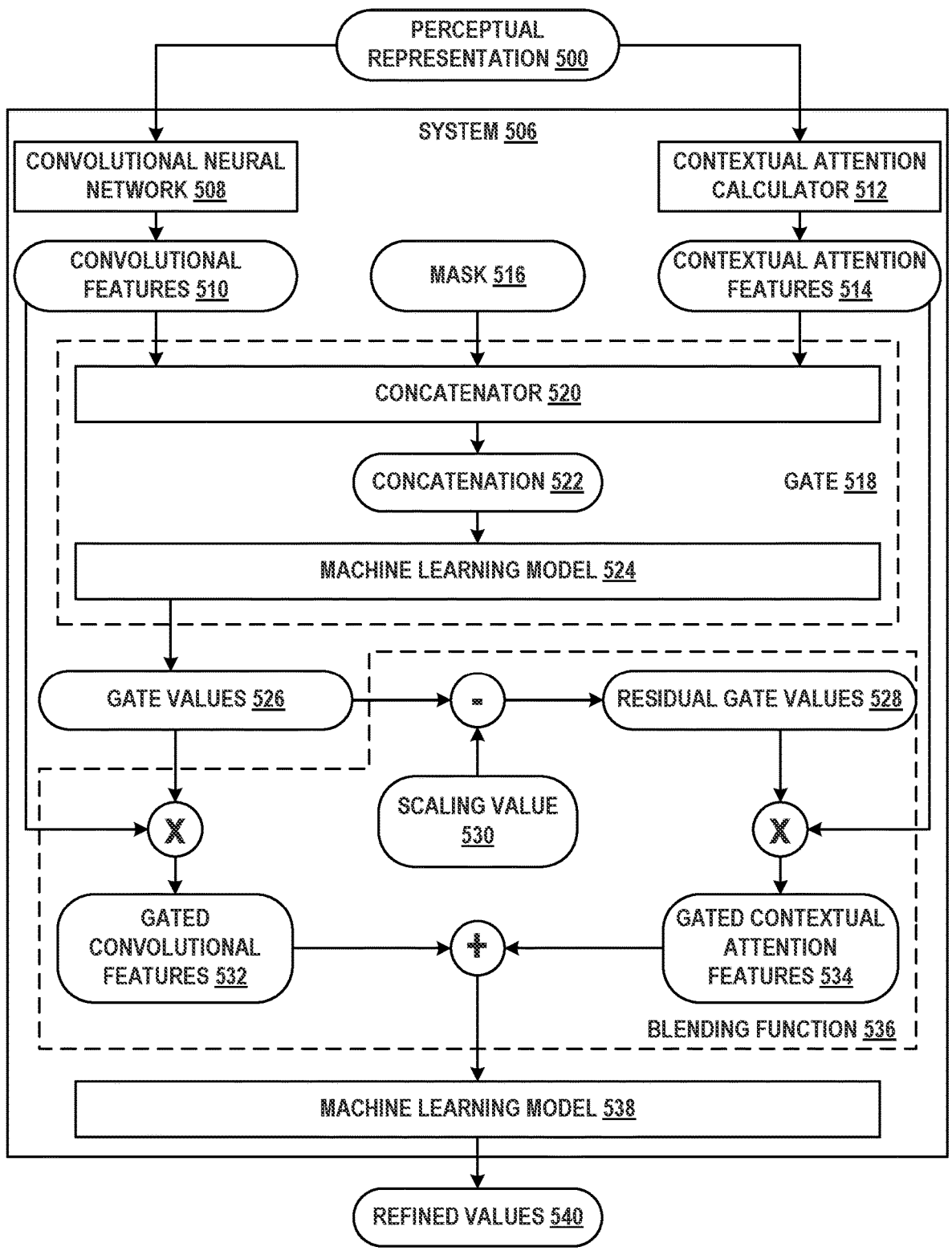
FIG. 5 illustrates a system, in accordance with examples described herein.

IV. Example System for Gating of Contextual Attention and Convolutional Features FIG. 5 illustrates an example system for gating contextual attention features and convolutional features. Specifically, FIG. 5 illustrates system 506 configured to generate refined values 540 based on perceptual representation 500. Perceptual representation 500 may correspond to coarse perceptual representation 306, and system 506 may represent and/or form part of refinement machine learning model 308. System 506 includes convolutional neural network 508, contextual attention calculator 512, gate 518 that includes concatenator 520 and machine learning model 524, blending function 536, and machine learning model 538.

Convolutional neural network 508 may be configured to generate convolutional features 510 based on perceptual representation 500. For example, each respective convolutional feature of convolutional features 510 may be generated by processing perceptual representation 500 using a corresponding convolutional kernel defined by convolutional neural network 508. When perceptual representation 500 is an image, for example, each convolutional feature of convolutional features 510 may be a two-dimensional feature map. Convolutional features 510 may be divided into a plurality of feature vectors, with each respective feature vector of the plurality of feature vectors representing the informational content of at least one corresponding sample of perceptual representation 500. Thus, the values of the plurality of feature vectors along a given dimension thereof may define a corresponding convolutional feature of convolutional features 510.

Convolutional features 510 may be determined at least for one or more portions of perceptual representation 500 marked for replacement and/or refinement by mask 516. In some implementations, convolutional features 510 may be determined for all portions of perceptual representation 500. Mask 516 may correspond to mask 302 of FIG. 3. Convolutional features 510 may be based on (i) coarse sample values associated with the one or more (masked) portions of perceptual representation marked for replacement and/or refinement by mask 516 and/or (ii) initial sample values associated with non-masked portions of perceptual representation 500. For example, convolutional kernels with relatively wide receptive fields may be used to generate convolutional features 510 based on both the coarse sample values of the masked portions and the initial sample values of the non-masked portions. Convolutional features 510 may provide a basis for generating a new sample value for a masked sample of perceptual representation 500, rather than copying a sample value from a non-masked portion of perceptual representation 500.

Contextual attention calculator 512 may be configured to generate contextual attention features 514 based on perceptual representation 500. Each respective contextual attention feature of contextual attention features 514 may be associated with at least one corresponding sample of perceptual representation 500. Contextual attention features 514 may be determined for samples of perceptual representation 500 marked for replacement and/or refinement by mask 516, and/or for samples of an entirety of perceptual representation 500. Each respective contextual attention feature of contextual attention features 514 may be generated by comparing at least one feature vector associated with the at least one corresponding sample to a plurality of other features vectors associated with corresponding other samples of perceptual representation 500.

For example, each respective contextual attention feature may be based on a comparison of (i) the feature vector associated with the corresponding sample(s) to (ii) a plurality of other feature vectors associated with corresponding other samples of non-masked portions of perceptual representation 500. In some cases, each respective contextual attention feature may be based on a comparison of (i) the feature vector associated with the corresponding sample(s) to (ii) each of the feature vectors associated with each of the samples of non-masked portions of perceptual representation 500. The comparison may be with non-masked portions, rather than masked portions, of perceptual representation 500, since the masked portions contain sample values that may have been synthesized by coarse machine learning model 304 (and thus might appear unrealistic or unnatural), whereas the non-masked portion contain sample values that have not been altered by coarse machine learning model 304.

The comparison performed by contextual attention calculator 512 may include an inner product between (i) the feature vector associated with the corresponding sample and (ii) each respective feature vector of the other feature vectors, followed by a softmax function (e.g., scaled softmax) along a dimension corresponding to the plurality of other feature vectors. Alternatively or additionally, the comparison performed by contextual attention calculator 512 may include a convolution between (i) two or more feature vectors associated with two or more corresponding samples and (ii) each respective set of two or more feature vectors of the other feature vectors, followed by the softmax function along a dimension corresponding to the plurality of other feature vectors. Thus, each respective contextual attention feature of contextual attention features 514 may represent an extent of similarity between (i) the feature vector(s) associated with the at least one corresponding sample and (ii) each of the plurality of other features vectors associated with the other samples of perceptual representation 500. Convolutional features 510 may provide a basis for copying a sample value from a non-masked portion of perceptual representation 500 to a masked sample of perceptual representation 500, rather than generating a new sample value for the masked sample of perceptual representation 500.

When perceptual representation 500 is an image, for example, each contextual attention feature of contextual attention features 514 may represent a degree of similarity between (i) a corresponding pixel and/or patch of pixels in the image (e.g., a pixel and/or patch of pixels in a masked portion and having coarse sample value(s) assigned thereto, and/or a pixels and/or patch of pixels in a non-masked portion and having the original, unmodified sample value(s)) and (ii) pixels and/or patches of pixels in non-masked portions of the image. For example, the image may be associated with x*y feature vectors corresponding to masked image portions (and thus representative of the coarse sample values) and i*j feature vectors corresponding to non-masked image portions, where * represents multiplication, x and i correspond to a horizontal dimension of the image and y and j correspond to a vertical dimension of the image. Each of the x*y and i*j feature vectors may be associated with one or more corresponding pixels. Thus, for example, determining a contextual attention feature corresponding to a particular feature vector of the x*y feature vectors may involve determining a dot product between (i) the given feature vector and (ii) each of the i*j feature vectors, followed by a softmax function with respect to the resulting i*j dot products, thereby generating a contextual attention feature having i*j values. Determining a contextual attention feature corresponding to a particular feature vector of the i*j feature vectors may involve determining a dot product between (i) the given feature vector and (ii) each of the i*j feature vectors, followed by a softmax function with respect to the resulting i*j dot products, thereby generating a contextual attention feature having i*j values.

The feature vectors used to determine contextual attention features 514 may be generated by processing perceptual representation 500 using one or more convolutional kernels defined by contextual attention calculator 512 (e.g., as discussed above with respect to convolutional features 510). In some cases, at least a portion of the convolutional kernels provided by convolutional neural network 508 may be shared with contextual attention calculator 512. In other cases, convolutional neural network 508 and contextual attention calculator 512 may each use different sets of convolutional kernels. Within examples, contextual attention calculator 512 may include (and thus contextual attention features 514 may be based on) aspects of global attention mechanisms and/or models, local attention mechanisms and/or models, hard attention mechanisms and/or models, soft attention mechanisms and/or models, and/or self-attention mechanisms and/or models.

Concatenator 520 may be configured to generate concatenation 522 based on convolutional features 510, contextual attention features 514, and mask 516. For example, each of convolutional features 510, contextual attention features 514, and mask 516 may share at least one dimension, or may be scaled to the shared dimension, and may be stacked together with the shared dimension aligned. For example, each of convolutional features 510, contextual attention features 514, and mask 516 may be tensors having a shared width and height, and may be stacked together depth-wise to form concatenation 522.

Machine learning model 524 may be configured to process concatenation 522 to generate gate values 526. Thus, machine learning model 524 may alternatively be referred to as a gating model. Machine learning model 524 may be, for example, a CNN defining a filter having a depth equal to a depth of concatenation 522. Thus, machine learning model 524 may be configured to reduce a three-dimensional tensor representing concatenation 522 along a depth dimension thereof to a two-dimensional matrix representing gate values 526.

Mask 516 may form part of concatenation 522, rather than being used to explicitly select a masked subset of convolutional features 510 and/or contextual attention features 514, to allow machine learning model 524 to adjust the portion of perceptual representation 500 to be in-filled. That is, machine learning model 524 may be trained to "trust" different portions of mask 516 to different extents, thus allowing masks based on, for example, inaccurate segmentation maps and/or inaccurate manually-specified outlines to be implicitly corrected using gate values 526 as part of the in-filling process. For example, machine learning model 524 may be configured to determine, based on concatenation 522, that a particular non-masked portion of perceptual representation 500 is to be regenerated, rather than maintained without modification, and may thus assigning a relatively high gate value to the particular non-masked portion.

Machine learning model 524 may be configured to determine gate values 526 along a predetermined range. For example, each of gate values 526 may be selected from a range of zero to scaling value 530 (e.g., a predetermined value, such as 1). Thus, an output layer of machine learning model 524 may be configured to map results of earlier layers thereof to the predetermined range (e.g., map to the range of 0 to 1 using a sigmoid function).

Gate values 526 may indicate, in a sample-wise manner, a relative contribution of convolutional features 510 to refined values 540. Thus, blending function 536 may be configured to multiply convolutional features 510 by gate values 526 to generate gated convolutional features 532. Additionally, blending function 536 may be configured to subtract each of gate values 526 from scaling value 530 to generate residual gate values 528. Residual gate values 528 may indicate, in a sample-wise manner, a relative contribution of contextual attention features 514 to refined values 540. Thus, blending function 536 may be configured to multiply contextual attention features 514 by residual gate values 528 to generate gated contextual attention features 534.

In other implementations, gate values 526 may instead correspond to contextual attention features 514, and may be multiplied therewith to generate gated contextual attention features 534. Thus, residual gate values 528 may instead correspond to convolutional features 510, and may be multiplied therewith to generate gated convolutional features 532. Nevertheless, training of machine learning model 524 in this alternative arrangement may result, for a given image, in an approximately equivalent set of gated convolution features 532 and gated contextual attention features 534.

Blending function 536 may also be configured to add gated convolutional features 532 to gated contextual attention features 534, and provide the resulting sum as input to machine learning model 538. Machine learning model 538 may be configured to generate refined values 540 based on the output of blending function 536. Thus, machine learning model 538 may alternatively be referred to as an in-filling model. In some implementations, rather than adding gated convolutional features 532 and gated contextual attention features 534, blending function 536 may instead be configured to concatenate gated convolutional features 532 and gated contextual attention features 534, and provide this concatenation as input to machine learning model 538.

Each respective gate value of gate values 526, and thus each respective residual gate value of residual gate values 528, may be associated with at least one corresponding sample of perceptual representation 500, and thus at least one corresponding refined value of refined values 540. Thus, the respective gate value may indicate the relative contribution of a corresponding convolutional feature of convolutional features 510 to the corresponding refined value(s), and the respective residual gate value may indicate the relative contribution of a corresponding contextual attention feature of contextual attention features 514 to the corresponding refined value(s). The respective gate value and its corresponding residual gate value sum to scaling value 530. Thus, the respective gate value indicates how much of the corresponding refined value is to result from generation of a new value (based on convolutional features 510), and how much of the corresponding refined value is to result from copying of other parts of perceptual representation 500 (based on contextual attention features 514).

Since gate values 526 are generated by machine learning model 524, machine learning model 524 may be trained to determine the relative sample-wise weighing between copied features and generative features. Specifically, machine learning model 524 may be explicitly trainable to determine the sample-wise weighing as part of the encoding of perceptual representation 500, rather than allowing machine learning model 538 to implicitly select the relative contribution of convolutional features 510 and contextual attention features 514 as part of the decoding process to determine refined values 540. Thus, the latent-space representation (e.g., the sum and/or concatenation of features 532 and 534) of perceptual representation 500 may be based on the sample-wise weighing. This may allow machine learning model 538 to include fewer parameters, thus decreasing the size of system 506, while improving the quality of the resulting refined perceptual representations.

System 506 may additionally or alternatively be adapted to operate at a plurality of different size scales. For example, convolutional neural network 508, contextual attention calculator 512, concatenator 520, gate 518, and/or blending function 536 may be configured to process and/or generate corresponding data at least for a first size scale and a second size scale different from the first size scale. Thus, respective instances of convolutional features 510, contextual attention features 514, concatenation 522, gate values 526, residual gate values 528, gated convolutional features 532, and/or gated contextual attention features 534 at the first and second size scales may be generated by system 506. Machine learning model 538 may thus be configured to generate refined values 540 based on gated convolutional features 532 at the first size scale, gated convolutional features 532 at the second size scale, gated contextual attention features 534 at the first size scale, and/or gated contextual attention features 534 at the second size scale.

System 506 and/or aspects thereof may be implemented as part of various architectures configured to generate refined sample values based on (i) features generated/synthesized using convolutions or other similar techniques and (ii) features copied from non-modified parts of a perceptual representation using contextual attention or other similar techniques. For example, system 506 and/or aspects thereof may be implemented as part of the architectures discussed in (i) a paper titled "Generative Image Inpainting with Contextual Attention" authored by Jiahui Yu et al. and published as arXiv:1801.07892, (ii) a paper titled "Contextual Residual Aggregation for Ultra High-Resolution Image Inpainting" authored by Zili Yi et al. and published as arXiv:2005.09704, and/or (iii) a paper titled "MUSICAL: Multi-Scale Image Contextual Attention Learning for Inpainting" authored by Ning Wang et al. and published in the Proceedings of the Twenty-Eighth International Joint Conference on Artificial Intelligence (IJCAI-19), among other possibilities.

Figure 6:
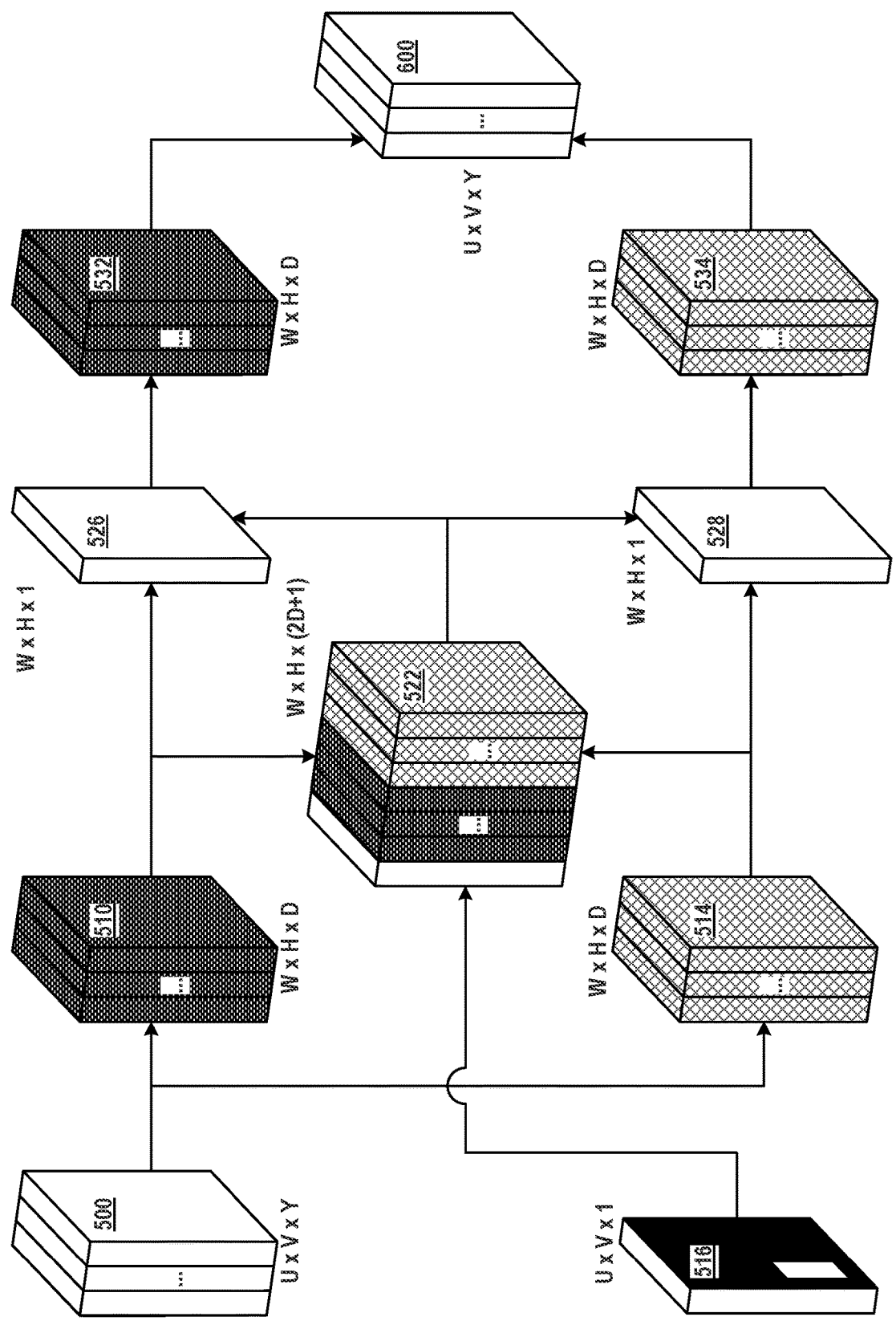
FIG. 6 illustrates processing of contextual attention features and convolutional features, in accordance with examples described herein.

FIG. 6 provides a visual illustration and example dimensions of the data processed and generated by system 506. Specifically, perceptual representation 500 is shown having a width U, a height V, and a depth Y. In the case of an RGB image, for example, Y may be equal to 3. Some perceptual representations may have fewer dimensions or more dimensions than shown in FIG. 6. Mask 516 corresponding to perceptual representation 500 has a width U, a height V, and a depth of 1. Each of the Y dimensions of perceptual representation 500 may be masked with the single depth layer of mask 516. A portion of mask 516 is shown in white to illustrate the corresponding portion of perceptual representation 500 to be removed and/or in-filled, and the rest of mask 516 is shown in black to illustrate the portion of perceptual representation 500 to be unmodified.

Convolutional features 510 and contextual attention features 514 may each have a width W, a height H, and a depth D. In some cases, the width W and the height H may be equal to the width U and the height V, respectively. Thus, each respective convolutional feature vector of convolutional features 510 may be associated with and/or represent one corresponding sample of perceptual representation 500, and each respective contextual attention feature vector of contextual attention features 514 may be associated with and/or represent one corresponding sample of perceptual representation 500.

In other cases, the width W and the height H may be different from the width U and the height V, respectively. In one example, the width W and the height H may be smaller than the width U and the height V, respectively, and may correspond to the entirety of the UxV perceptual representation 500. Thus, each respective convolutional feature vector of convolutional features 510 may be associated with and/or represent two or more corresponding samples of perceptual representation 500, and each respective contextual attention feature vector of contextual attention features 514 may be associated with and/or represent two or more corresponding samples of perceptual representation 500. In another example, the width W and the height H may be smaller than the width U and the height V, respectively, and may correspond to the masked portion of the UxV perceptual representation 500. Thus, each respective convolutional feature vector of convolutional features 510 may be associated with and/or represent one or more corresponding samples of the masked portion of perceptual representation 500, and each respective contextual attention feature vector of contextual attention features 514 may be associated with and/or represent one or more corresponding samples of the masked portion of perceptual representation 500.

In implementations where gated convolutional features 532 are added to gated contextual attention features 534 by blending function 536, convolutional features 510 and contextual attention features 514 may have the same depth dimension D. In implementations where gated convolutional features 532 are concatenated with gated contextual attention features 534 by blending function 536, convolutional features 510 may have a different depth dimension $D_{CONVOLUTIONAL}$ than depth dimension $D_{CONTEXTUAL}$ of contextual attention features 514.

Concatenation 522 may have a width W, a height H, and a depth (2D+1). In implementations where the width W and the height H of convolutional features 510 and/or contextual attention features 514 are different from the width U and the height V of mask 516, mask 516 may be resized (e.g., by concatenator 520) from UxVx1 to WxHx1. In implementations where convolutional features 510 have the depth dimension $D_{CONVOLUTIONAL}$ that is different than the depth dimension $D_{CONTEXTUAL}$ of contextual attention features 514, concatenation 522 may instead have a width W, a height H, and a depth ($D_{CONVOLUTIONAL}+D_{CONTEXTUAL}+1$).

Gate values 526 and residual gate values 528 may each have a width W, a height H, and a depth of 1. Accordingly, machine learning model 524 may include a filter having a depth (2D+1) or ($D_{CONVOLUTIONAL}+D_{CONTEXTUAL}+1$), depending on the implementation. Thus, each respective WxH layer of the D depth layers of convolutional features 510 may be gated using the same set of gating values 526, and each respective WxH layer of the D depth layers of contextual attention features 514 may be gated using the same set of residual gating values 528. In implementations where convolutional features 510 and contextual attention features 514 have the same depth dimension D, gated convolutional features 532 and contextual attention features 534 may each have a width W, a height H, and a depth D. In implementations where convolutional features 510 have the depth dimension $D_{CONVOLUTIONAL}$ that is different than the depth dimension $D_{CONTEXTUAL}$ of contextual attention features 514, gated convolutional features 532 may have a width W, a height H, and a depth $D_{CONVOLUTIONAL}$ and contextual attention features 534 may have a width W, a height H, and a depth $D_{CONTEXTUAL}$.

Alternatively, in some implementations, gate values 526 and residual gate values 528 may each have a width W, a height H, and a depth of $D_{GATE}$ different than 1. For example, $D_{GATE}$ may be equal to (2D+1) or ($D_{CONVOLUTIONAL}$ $D_{CONTEXTUAL}+1$), depending on the implementation. Accordingly, machine learning model 524 may include (2D+1) or ($D_{CONVOLUTIONAL}$ $D_{CONTEXTUAL}+1$) filters, depending on the implementation, each having a depth of 1. Thus, each respective WxH layer of the D (or $D_{CONVOLUTIONAL}$) depth layers of convolutional features 510 may be gated using a corresponding subset of gating values 526, and each respective WxH layer of the D (or $D_{CONTEXTUAL}$) depth layers of contextual attention features 514 may be gated using the corresponding subset of residual gating values 528. Gated convolutional features 532 may have a width W, a height H, and a depth D (or $D_{CONVOLUTIONAL}$), and gated contextual attention features 534 may have a width W, a height H, and a depth D (or $D_{CONTEXTUAL}$).

Refined perceptual representation 600 may have a width U, a height V, and a depth Y. At least a portion of refined perceptual representation 600 (e.g., the portion indicated by mask 516) may include refined values 540. Refined perceptual representation 600 may correspond to refined perceptual representation 310 of FIG. 3. Refined perceptual representation 600 may thus correspond to perceptual representation 500 with the masked portions thereof replaced by refined sample values. The gating architecture provided by system 506 may allow refined perceptual representation 600 to have a higher quality (e.g., visually, aurally, textually, etc.) and/or appear more natural (rather than synthesized) than a refined perceptual representation generated without using this gating architecture.

V. Additional Example Operations

Figure 7:
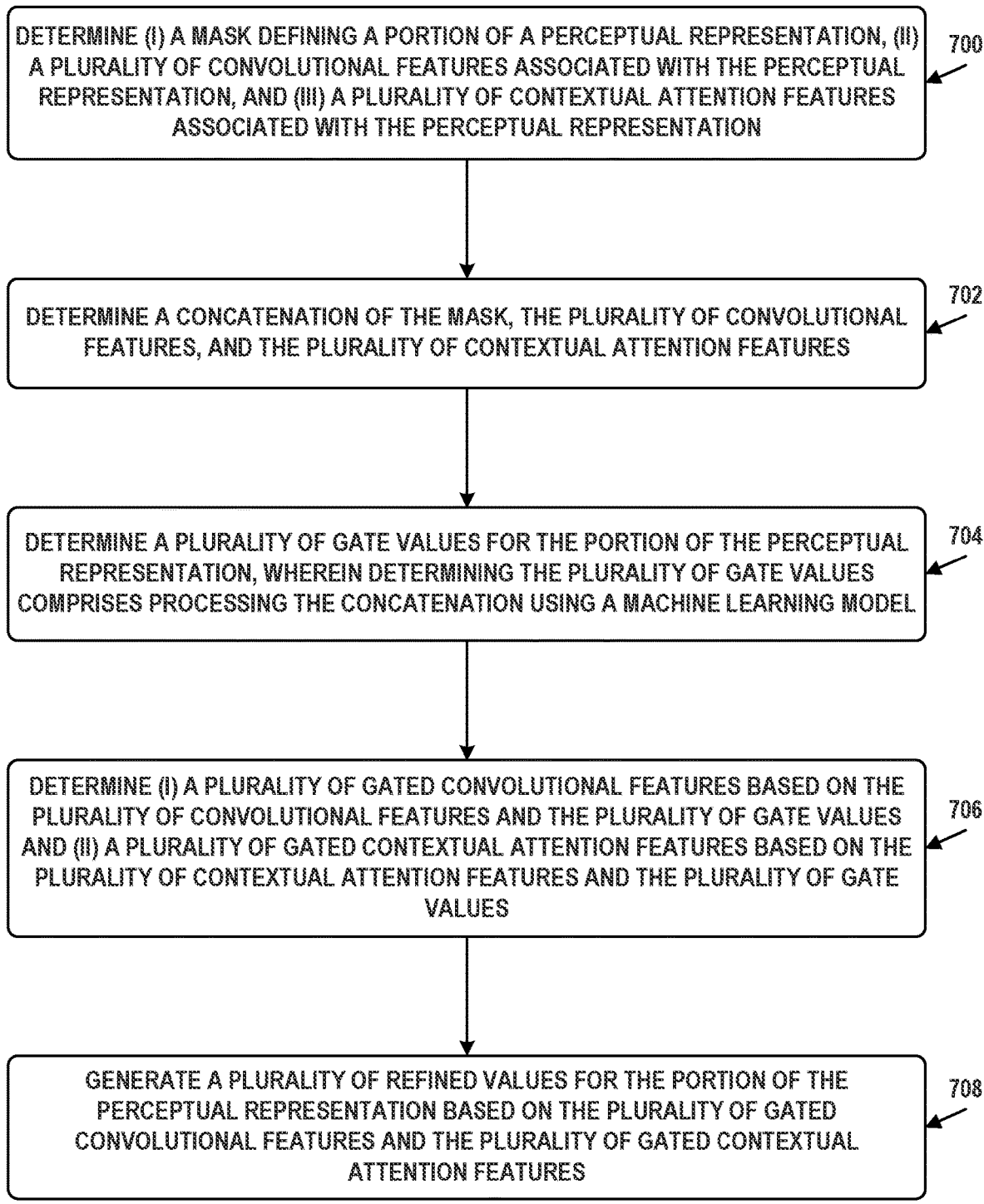
FIG. 7 is a flow chart, in accordance with examples described herein.

FIG. 7 illustrates a flow chart of operations related to generating refined values for a portion of a perceptual representation. The operations may be carried out by computing device 100, computing system 200, system 320, and/or system 506, among other possibilities. The embodiments of FIG. 7 may be simplified by the removal of any one or more of the features shown therein. Further, these embodiments may be combined with features, aspects, and/or implementations of any of the previous figures or otherwise described herein.

Block 700 may involve determining (i) a mask defining a portion of a perceptual representation, (ii) a plurality of convolutional features associated with the perceptual representation, and (iii) a plurality of contextual attention features associated with the perceptual representation.

Block 702 may involve determining a concatenation of the mask, the plurality of convolutional features, and the plurality of contextual attention features.

Block 704 may involve determining a plurality of gate values for the portion of the perceptual representation. Determining the plurality of gate values may include processing the concatenation using a machine learning model.

Block 706 may involve determining (i) a plurality of gated convolutional features based on the plurality of convolutional features and the plurality of gate values and (ii) a plurality of gated contextual attention features based on the plurality of contextual attention features and the plurality of gate values.

Block 708 may involve generating a plurality of refined values for the portion of the perceptual representation based on the plurality of gated convolutional features and the plurality of gated contextual attention features.

In some embodiments, the portion of the perceptual representation may include a plurality of samples. For each respective sample of the plurality of samples, a corresponding coarse sample value may be generated by a coarse machine learning model. The plurality of convolutional features and the plurality of contextual attention features may each be determined based on the corresponding coarse sample value of each respective sample.

In some embodiments, each respective sample of the plurality of samples may be associated with (i) a corresponding convolutional feature of the plurality of convolutional features representing a generated sample value for the respective sample, and (ii) a corresponding contextual attention feature of the plurality of convolutional features representing a copied sample value for the respective sample. Determining the plurality of gate values may include determining, for each respective sample, a corresponding gate value of the plurality of gate values. Determining (i) the plurality of gated convolutional features may include determining, for each respective sample, a corresponding gated convolutional feature of the plurality of gated convolutional features and (ii) the plurality of gated contextual attention features may include determining, for each respective sample, a corresponding gated contextual attention feature of the plurality of gated contextual attention features. Generating the refined values for the portion of the perceptual representation may include generating, for each respective sample, a corresponding refined value of the plurality of refined values based on the corresponding gated convolutional feature and the corresponding gated contextual attention feature.

In some embodiments, determining the plurality of gate values may include determining a convolution of the concatenation and one or more convolutional kernels of the machine learning model.

In some embodiments, determining (i) the plurality of gated convolutional features may include determining a product of the plurality of convolutional features and the plurality of gate values.

In some embodiments, determining (ii) the plurality of gated contextual attention features may include determining a plurality of residual gate values based on a plurality of differences between a predetermined value and the plurality of gate values, and determining a product of (i) the plurality of contextual attention features and (ii) the plurality of residual gate values.

In some embodiments, each respective gate value of the plurality of gate values may result from a mapping by the machine learning model to a range between zero and the predetermined value.

In some embodiments, generating the plurality of refined values may include determining a sum of the plurality of gated convolutional features and the plurality of gated contextual attention features, and generating the plurality of refined values based on the sum.

In some embodiments, generating the plurality of refined values may include determining a second concatenation of the plurality of gated convolutional features and the plurality of gated contextual attention features, and generating the plurality of refined values based on the second concatenation.

In some embodiments, the portion of the perceptual representation may be a first portion of the perceptual representation. The mask may include a first region indicating to replace the first portion of the perceptual representation using the plurality of refined values and a second region defining a second portion of the perceptual representation and indicating that the second portion of the perceptual representation is to remain unmodified.

In some embodiments, the perceptual representation may include one or more of: (i) a two-dimensional image, (ii) a three-dimensional image, (iii) a point cloud, (iv) a waveform, or (v) a textual data.

In some embodiments, a second mask defining the portion of the perceptual representation at a second size scale different from a first size scale associated with the mask, the plurality of convolutional features, and the plurality of contextual attention features may be determined. A second plurality of convolutional features associated with the perceptual representation at the second size scale may be determined. A second plurality of contextual attention features associated with the perceptual representation at the second size scale may be determined. A further concatenation of the second mask, the second plurality of convolutional features, and the second plurality of contextual attention features may be determined. A second plurality of gate values at the second size scale may be determined for the portion of the perceptual representation. Determining the second plurality of gate values may include processing the further concatenation using a second machine learning model associated with the second size scale. A second plurality of gated convolutional features at the second size scale may be determined based on the second plurality of convolutional features and the second plurality of gate values. A second plurality of gated contextual attention features at the second size scale may be determined based on the second plurality of contextual attention features and the second plurality of gate values. The plurality of refined values for the portion of the perceptual representation may be generated further based on the second plurality of gated convolutional features and the second plurality of gated contextual attention features.

In some embodiments, the machine learning model may be trained to generate the plurality of gate values, and training of the machine learning model may include obtaining a training perceptual representation and removing a portion of the training perceptual representation. A plurality of refined values may be generated for the removed portion of the training perceptual representation based on processing, by the machine learning model, of a concatenation of (i) a training mask defining the removed portion of the training perceptual representation, (ii) a plurality of training convolutional features associated with the training perceptual representation, and (iii) a plurality of training contextual attention features associated with the training perceptual representation. A loss value may be determined using a loss function based on a comparison of the plurality of refined values for the removed portion to corresponding values of the training perceptual representation. One or more parameters of the machine learning model may be adjusted based on the loss value and the loss function.

VI. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:
   determining (i) a mask defining a portion of a perceptual representation, (ii) a plurality of convolutional features associated with the perceptual representation, and (iii) a plurality of contextual attention features associated with the perceptual representation;
   determining a concatenation of the mask, the plurality of convolutional features, and the plurality of contextual attention features;
   determining a plurality of gate values for the portion of the perceptual representation, wherein determining the plurality of gate values comprises processing the concatenation using a machine learning model;
   determining (i) a plurality of gated convolutional features based on the plurality of convolutional features and the plurality of gate values and (ii) a plurality of gated contextual attention features based on the plurality of contextual attention features and the plurality of gate values; and
   generating a plurality of refined values for the portion of the perceptual representation based on the plurality of gated convolutional features and the plurality of gated contextual attention features.

2. The computer-implemented method of claim 1, wherein the portion of the perceptual representation comprises a plurality of samples, and wherein the computer-implemented method further comprises:
   generating, by a coarse machine learning model and for each respective sample of the plurality of samples, a corresponding coarse sample value, wherein the plurality of convolutional features and the plurality of contextual attention features are each determined based on the corresponding coarse sample value of each respective sample.

3. The computer-implemented method of claim 2, wherein:
   each respective sample of the plurality of samples is associated with (i) a corresponding convolutional feature of the plurality of convolutional features representing a generated sample value for the respective sample, and (ii) a corresponding contextual attention feature of the plurality of convolutional features representing a copied sample value for the respective sample;
   determining the plurality of gate values comprises determining, for each respective sample, a corresponding gate value of the plurality of gate values;
   determining (i) the plurality of gated convolutional features comprises determining, for each respective sample, a corresponding gated convolutional feature of the plurality of gated convolutional features and (ii) the plurality of gated contextual attention features comprises determining, for each respective sample, a corresponding gated contextual attention feature of the plurality of gated contextual attention features; and
   generating the refined values for the portion of the perceptual representation comprises generating, for each respective sample, a corresponding refined value of the plurality of refined values based on the corresponding gated convolutional feature and the corresponding gated contextual attention feature.

4. The computer-implemented method of claim 1, wherein determining the plurality of gate values comprises:
   determining a convolution of the concatenation and one or more convolutional kernels of the machine learning model.

5. The computer-implemented method of claim 1, wherein determining (i) the plurality of gated convolutional features comprises:
   determining a product of the plurality of convolutional features and the plurality of gate values.

6. The computer-implemented method of claim 1, wherein determining (ii) the plurality of gated contextual attention features comprises:
   determining a plurality of residual gate values based on a plurality of differences between a predetermined value and the plurality of gate values; and
   determining a product of (i) the plurality of contextual attention features and (ii) the plurality of residual gate values.

7. The computer-implemented method of claim 6, wherein each respective gate value of the plurality of gate values results from a mapping by the machine learning model to a range between zero and the predetermined value.

8. The computer-implemented method of claim 1, wherein generating the plurality of refined values comprises:
   determining a sum of the plurality of gated convolutional features and the plurality of gated contextual attention features; and
   generating the plurality of refined values based on the sum.

9. The computer-implemented method of claim 1, wherein generating the plurality of refined values comprises:
   determining a second concatenation of the plurality of gated convolutional features and the plurality of gated contextual attention features; and
   generating the plurality of refined values based on the second concatenation.

10. The computer-implemented method of claim 1, wherein the portion of the perceptual representation is a first portion of the perceptual representation, and wherein the mask comprises a first region indicating to replace the first portion of the perceptual representation using the plurality of refined values and a second region defining a second portion of the perceptual representation and indicating that the second portion of the perceptual representation is to remain unmodified.

11. The computer-implemented method of claim 1, wherein the perceptual representation comprises one or more of: (i) a two-dimensional image, (ii) a three-dimensional image, (iii) a point cloud, (iv) a waveform, or (v) a textual data.

12. The computer-implemented method of claim 1, further comprising:
   determining (i) a second mask defining the portion of the perceptual representation at a second size scale different from a first size scale associated with the mask, the plurality of convolutional features, and the plurality of contextual attention features, (ii) a second plurality of convolutional features associated with the perceptual representation at the second size scale, and (iii) a second plurality of contextual attention features associated with the perceptual representation at the second size scale;
   determining a further concatenation of the second mask, the second plurality of convolutional features, and the second plurality of contextual attention features;
   determining a second plurality of gate values at the second size scale for the portion of the perceptual representation, wherein determining the second plurality of gate values comprises processing the further concatenation using a second machine learning model associated with the second size scale;
   determining (i) a second plurality of gated convolutional features at the second size scale based on the second plurality of convolutional features and the second plurality of gate values and (ii) a second plurality of gated contextual attention features at the second size scale based on the second plurality of contextual attention features and the second plurality of gate values; and
   generating the plurality of refined values for the portion of the perceptual representation further based on the second plurality of gated convolutional features and the second plurality of gated contextual attention features.

13. The computer-implemented method of claim 1, wherein the machine learning model is trained to generate the plurality of gate values, and wherein training of the machine learning model comprises:
   obtaining a training perceptual representation;
   removing a portion of the training perceptual representation;
   generating a plurality of refined values for the removed portion of the training perceptual representation based on processing, by the machine learning model, of a concatenation of (i) a training mask defining the removed portion of the training perceptual representation, (ii) a plurality of training convolutional features associated with the training perceptual representation, and (iii) a plurality of training contextual attention features associated with the training perceptual representation;
   determining, using a loss function, a loss value based on a comparison of the plurality of refined values for the removed portion to corresponding values of the training perceptual representation; and
   adjusting one or more parameters of the machine learning model based on the loss value and the loss function.

14. A system comprising:
a processor; and
a non-transitory computer-readable medium having stored thereon instructions that, when executed by the processor, cause the processor to perform operations comprising:
   determining (i) a mask defining a portion of a perceptual representation, (ii) a plurality of convolutional features associated with the perceptual representation, and (iii) a plurality of contextual attention features associated with the perceptual representation;
   determining a concatenation of the mask, the plurality of convolutional features, and the plurality of contextual attention features;
   determining a plurality of gate values for the portion of the perceptual representation, wherein determining the plurality of gate values comprises processing the concatenation using a machine learning model;
   determining (i) a plurality of gated convolutional features based on the plurality of convolutional features and the plurality of gate values and (ii) a plurality of gated contextual attention features based on the plurality of contextual attention features and the plurality of gate values; and
   generating a plurality of refined values for the portion of the perceptual representation based on the plurality of gated convolutional features and the plurality of gated contextual attention features.

15. A non-transitory computer-readable medium having stored thereon instructions that, when executed by a computing device, cause the computing device to perform operations comprising:
   determining (i) a mask defining a portion of a perceptual representation, (ii) a plurality of convolutional features associated with the perceptual representation, and (iii) a plurality of contextual attention features associated with the perceptual representation;
   determining a concatenation of the mask, the plurality of convolutional features, and the plurality of contextual attention features;
   determining a plurality of gate values for the portion of the perceptual representation, wherein determining the plurality of gate values comprises processing the concatenation using a machine learning model;
   determining (i) a plurality of gated convolutional features based on the plurality of convolutional features and the plurality of gate values and (ii) a plurality of gated contextual attention features based on the plurality of contextual attention features and the plurality of gate values; and
   generating a plurality of refined values for the portion of the perceptual representation based on the plurality of gated convolutional features and the plurality of gated contextual attention features.

16. The non-transitory computer-readable medium of claim 15, wherein the portion of the perceptual representation comprises a plurality of samples, and wherein the operations further comprise:

generating, by a coarse machine learning model and for each respective sample of the plurality of samples, a corresponding coarse sample value, wherein the plurality of convolutional features and the plurality of contextual attention features are each determined based on the corresponding coarse sample value of each respective sample.

17. The non-transitory computer-readable medium of claim 16, wherein:

each respective sample of the plurality of samples is associated with (i) a corresponding convolutional feature of the plurality of convolutional features representing a generated sample value for the respective sample, and (ii) a corresponding contextual attention feature of the plurality of convolutional features representing a copied sample value for the respective sample;

determining the plurality of gate values comprises determining, for each respective sample, a corresponding gate value of the plurality of gate values;

determining (i) the plurality of gated convolutional features comprises determining, for each respective sample, a corresponding gated convolutional feature of the plurality of gated convolutional features and (ii) the plurality of gated contextual attention features comprises determining, for each respective sample, a corresponding gated contextual attention feature of the plurality of gated contextual attention features; and generating the refined values for the portion of the perceptual representation comprises generating, for each respective sample, a corresponding refined value of the plurality of refined values based on the corresponding gated convolutional feature and the corresponding gated contextual attention feature.

18. The non-transitory computer-readable medium of claim 15, wherein determining the plurality of gate values comprises:

determining a convolution of the concatenation and one or more convolutional kernels of the machine learning model.

19. The non-transitory computer-readable medium of claim 15, wherein determining (i) the plurality of gated convolutional features comprises:

determining a product of the plurality of convolutional features and the plurality of gate values.

20. The non-transitory computer-readable medium of claim 15, wherein determining (ii) the plurality of gated contextual attention features comprises:

determining a plurality of residual gate values based on a plurality of differences between a predetermined value and the plurality of gate values; and determining a product of (i) the plurality of contextual attention features and (ii) the plurality of residual gate values.

* * * * *